United States Patent
Nagai et al.

(10) Patent No.: US 9,829,092 B2
(45) Date of Patent: Nov. 28, 2017

(54) VEHICLE CONTROL DEVICE

(71) Applicant: TOYOTA JIDOSHA KABUSHIKI KAISHA, Toyota-shi, Aichi-ken (JP)

(72) Inventors: Tadayuki Nagai, Susono (JP); Masami Kondo, Aichi-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/831,242

(22) Filed: Aug. 20, 2015

(65) Prior Publication Data
US 2016/0061317 A1 Mar. 3, 2016

(30) Foreign Application Priority Data

Sep. 3, 2014 (JP) .................... 2014-179409

(51) Int. Cl.
*F16H 61/02* (2006.01)
*F16H 59/32* (2006.01)
(Continued)

(52) U.S. Cl.
CPC ......... *F16H 61/0213* (2013.01); *B60W 10/00* (2013.01); *F02D 29/02* (2013.01);
(Continued)

(58) Field of Classification Search
None
See application file for complete search history.

(56) References Cited

U.S. PATENT DOCUMENTS 5,109,826 A * 5/1992 Kato ................ B60W 10/06
123/564
5,213,186 A 5/1993 Murata
(Continued)

FOREIGN PATENT DOCUMENTS

CN 101111700 A 1/2008
JP S61-104128 A 5/1986
(Continued)

OTHER PUBLICATIONS

Notice of Allowance dated Jan. 4, 2017 in U.S. Appl. No. 14/739,123.
(Continued)

*Primary Examiner* — Colby M Hansen
(74) *Attorney, Agent, or Firm* — Andrews Kurth Kenyon LLP

(57) ABSTRACT

A vehicle control device includes: a change gear ratio changing circuit configured to execute an up-shift of a change gear ratio in an automatic transmission; a change gear ratio determination circuit configured to determine whether or not an up-shift condition is satisfied based on a change gear diagrammatic view; a combustion mode determination circuit configured to determine whether or not a switching condition for switching from a predetermined combustion mode, in which an air-fuel ratio of the engine is an air-fuel ratio on a rich side than a lean air-fuel ratio, to a supercharged lean combustion mode, in which the air-fuel ratio of an engine is made to the lean air-fuel ratio while executing supercharging by a supercharger, is satisfied; and a change regulating circuit configured to regulate the change gear ratio changing circuit to execute the up-shift at the time both conditions are satisfied.

10 Claims, 11 Drawing Sheets

(51) Int. Cl.
  *B60W 10/00* (2006.01)
  *F02D 41/02* (2006.01)
  *F02D 41/00* (2006.01)
  *F02D 29/02* (2006.01)
  *F16H 59/74* (2006.01)
  *F02D 41/30* (2006.01)
  *F02D 41/10* (2006.01)

(52) U.S. Cl.
  CPC ....... *F02D 41/0007* (2013.01); *F02D 41/023* (2013.01); *F02D 41/3064* (2013.01); *F16H 59/32* (2013.01); *F16H 59/74* (2013.01); *F02D 41/10* (2013.01); *F02D 2200/101* (2013.01); *F02D 2200/602* (2013.01); *Y02T 10/144* (2013.01)

(56) References Cited

U.S. PATENT DOCUMENTS

| | | |
|---|---|---|
| 5,226,351 A | 7/1993 | Matsuoka et al. |
| 6,327,856 B1 | 12/2001 | Iwabuchi et al. |
| 7,736,268 B2 * | 6/2010 | Tanaka .................... F16H 59/24 477/125 |
| 2008/0207395 A1 | 8/2008 | Tanaka |
| 2010/0071658 A1 | 3/2010 | Soejima et al. |
| 2014/0338327 A1 | 11/2014 | Borean et al. |
| 2015/0113979 A1 | 4/2015 | Surnilla et al. |
| 2015/0184740 A1 | 7/2015 | Masunaga et al. |
| 2015/0337790 A1 | 11/2015 | Schuele et al. |
| 2015/0353092 A1 | 12/2015 | Hotta |
| 2015/0361906 A1 * | 12/2015 | Nagai ................. F02D 41/0007 123/568.11 |
| 2016/0061317 A1 | 3/2016 | Nagai et al. |

FOREIGN PATENT DOCUMENTS

| | | |
|---|---|---|
| JP | H04187820 A | 7/1992 |
| JP | H07217472 A | 8/1995 |
| JP | 2002-331857 A | 11/2002 |
| JP | 2006-300253 A | 11/2006 |
| JP | 2008-121511 A | 5/2008 |
| JP | 2008-121539 A | 5/2008 |
| JP | 2008/157104 A | 7/2008 |
| JP | 2009-144575 A | 7/2009 |
| WO | 2014/020685 A1 | 6/2014 |

OTHER PUBLICATIONS

US Patent and Trademark Office, Corrected Notice of Allowability in U.S. Appl. No. 14/739,123, dated Apr. 5, 2017, 2 pages.

* cited by examiner

VEHICLE CONTROL DEVICE

CROSS-REFERENCE TO RELATED APPLICATIONS

The present application claims priority to and incorporates by reference the entire contents of Japanese Patent Application No. 2014-179409 filed in Japan on Sep. 3, 2014.

BACKGROUND OF THE INVENTION

1. Field of the Invention

The present invention relates to a vehicle control device.

2. Description of the Related Art

A vehicle control device that is mounted on a vehicle, which includes an engine with a supercharger and an automatic transmission coupled to the engine, and that controls an air-fuel ratio of the engine according to an operation state of the engine to switch a combustion mode is conventionally known (see e.g., Japanese Patent Application Laid-Open No. 2009-144575 and Japanese Patent Application Laid-Open No. 2006-300253).

Among the various combustion modes, a necessary intake air amount is large in a lean combustion mode (hereinafter described as a supercharged lean combustion mode), in which supercharging is executed by a supercharger, compared to the other combustion modes (e.g., stoichiometric combustion mode), in which the air-fuel ratio is an air-fuel ratio on a rich side than the air-fuel ratio in the supercharged lean combustion mode. In other words, when switching to the supercharged lean combustion mode from another combustion mode, the supercharging pressure needs to be raised to a required supercharging pressure required in the supercharged lean combustion mode.

If an up-shift of a change gear ratio in the automatic transmission is executed when switching to the supercharged lean combustion mode from another combustion mode, an engine rotation number decreases with the execution of the up-shift and hence the rise of the supercharging pressure may be delayed. In other words, in the case described above, the transition to the supercharged lean combustion mode is delayed and the other combustion mode is maintained, and consequently, the fuel efficiency lowers.

SUMMARY OF THE INVENTION

It is an object of the present invention to at least partially solve the problems in the conventional technology.

According to one aspect of the present invention, there is provided a vehicle control device for being mounted on a vehicle including an engine with a supercharger and an automatic transmission coupled to the engine, and for controlling an operation of the vehicle, including: a change gear ratio changing circuit configured to execute an up-shift of a change gear ratio in the automatic transmission; a change gear ratio determination circuit configured to determine whether or not an up-shift condition for executing the up-shift of the change gear ratio is satisfied based on a change gear diagrammatic view; a combustion mode determination circuit configured to determine whether or not a switching condition for switching from a predetermined combustion mode, in which an air-fuel ratio of the engine is an air-fuel ratio on a rich side than a lean air-fuel ratio, to a supercharged lean combustion mode, in which the air-fuel ratio of the engine is made to the lean air-fuel ratio while executing supercharging by the supercharger, is satisfied; and a change regulating circuit configured to regulate the change gear ratio changing circuit to execute the up-shift of the change gear ratio at the time both conditions, the up-shift condition and the switching condition, are satisfied.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a timing chart illustrating a behavior of an engine rotation number by an operation of the vehicle control device illustrated in FIG. 3, a supercharging pressure by a supercharger, and the like;

FIG. 6 is a timing chart illustrating a behavior of an engine rotation number by an operation of the vehicle control device illustrated in FIG. 5, a supercharging pressure by a supercharger, and the like;

FIG. 9 is a timing chart illustrating a behavior of an engine rotation number by the operation of the vehicle control device illustrated in FIG. 8, an NOx occluded amount, a supercharging pressure by the supercharger, and the like;

FIG. 11 is a timing chart illustrating a behavior of an engine rotation number by the operation of the vehicle control device illustrated in FIG. 10, a supercharging pressure by the supercharger, and the like.

DETAILED DESCRIPTION OF THE PREFERRED EMBODIMENTS

Figure 1:
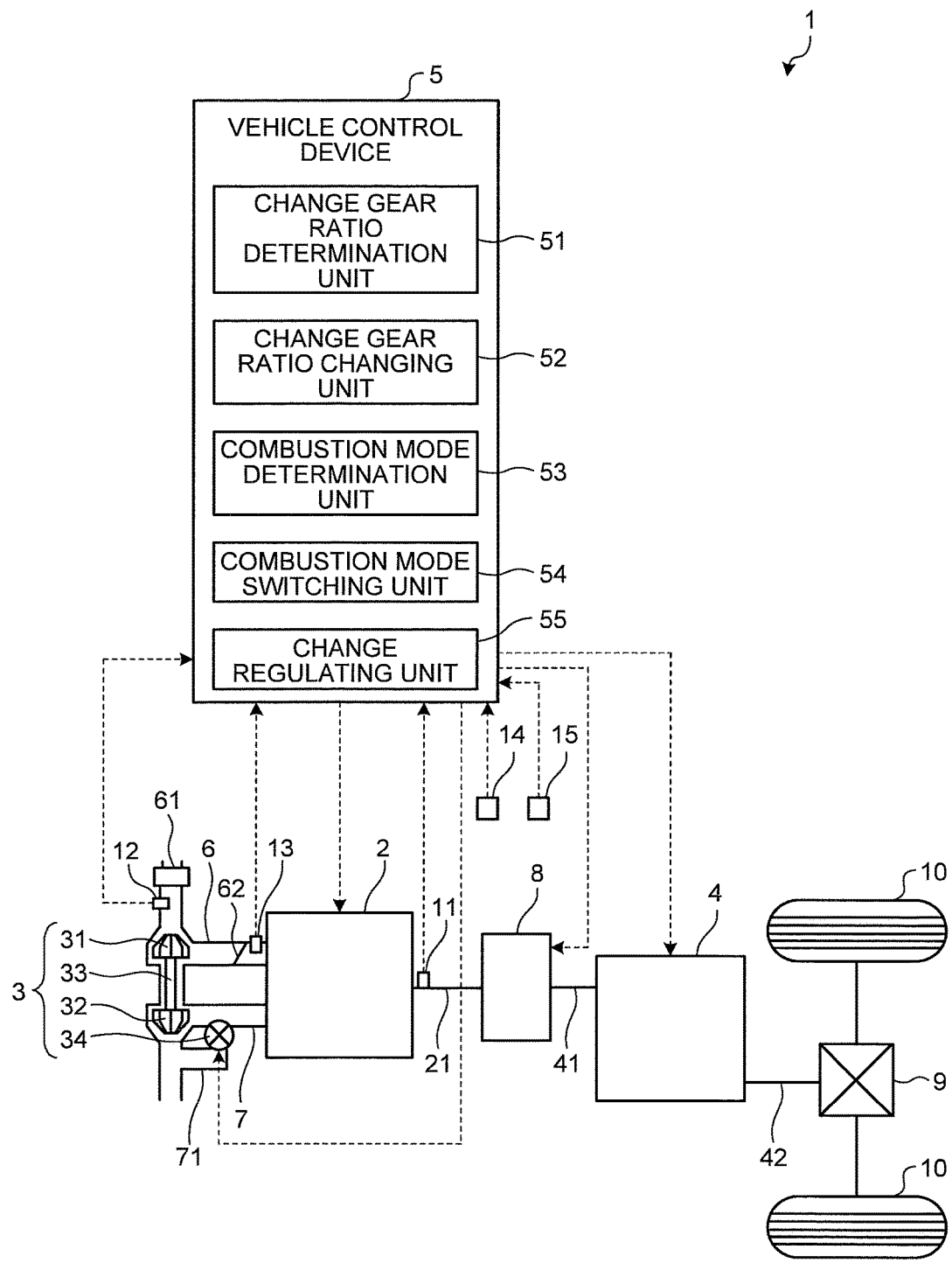
FIG. 1 is a diagram schematically illustrating a configuration of a vehicle according to a first embodiment of the present invention.

Hereinafter, a mode for carrying out the present invention (hereinafter described as an embodiment) will be described with reference to the drawings. The present invention is not limited by the embodiments described below. Furthermore, the same reference numerals are denoted on the same portions in the description of the drawings.

First Embodiment

Schematic configuration of vehicle

FIG. 1 is a diagram schematically illustrating a configuration of a vehicle 1 according to a first embodiment of the present invention.

The vehicle 1 enables a combustion mode of an engine 2 to be switched to various combustion modes according to an operation state of the engine 2. As illustrated in FIG. 1, the vehicle 1 includes the engine 2 with a supercharger 3, an automatic transmission 4, and a vehicle control device 5.

The engine 2 converts a combustion energy of a fuel to be combusted in a cylinder to a rotation energy of a crankshaft 21, and outputs the same under the control of the vehicle control device 5.

The supercharger 3 supplies a high pressure air to each cylinder of the engine 2 under the control of the vehicle control device 5. As illustrated in FIG. 1, the supercharger 3 includes a compressor 31, a turbine 32, a coupling shaft 33 for coupling the compressor 31 and the turbine 32, and a wastegate valve 34.

As illustrated in FIG. 1, the compressor 31 is arranged in an intake tube 6 of the engine 2. The air taken into the intake tube 6 through an air cleaner 61 is sent to each cylinder of the engine 2 through the compressor 31.

In the intake tube 6, a throttle valve 62 that controls the intake air amount of each cylinder of the engine 2 is arranged downstream of the compressor 31.

As illustrated in FIG. 1, the turbine 32 is arranged in an exhaust tube 7 of the engine 2. The exhaust air generated in each cylinder of the engine 2 is discharged though the exhaust tube 7.

As illustrated in FIG. 1, a bypass passage 71, which is an exhaust passage that circumvents the turbine 32, is arranged at the exhaust tube 7.

As illustrated in FIG. 1, the wastegate valve 34 is arranged on the bypass passage 71 to open/close the bypass passage 71 under the control of the vehicle control device 5.

In a state the bypass passage 71 is closed by the wastegate valve 34, the exhaust air discharged from each cylinder of the engine 2 to the exhaust tube 7 is flowed through the turbine 32, thus rotating the turbine 32. The compressor 31 is rotated with the rotation of the turbine 32, so that the air taken into the intake tube 6 through the air cleaner 61 is compressed (pressurized) by the compressor 31, and sent to each cylinder of the engine 2. In other words, the supercharger 3 executes supercharging when the bypass passage 71 is closed by the wastegate valve 34.

In a state the bypass passage 71 is opened by the wastegate valve 34, the exhaust air discharged from each cylinder of the engine 2 to the exhaust tube 7 is flowed to the bypass passage 71 and discharged while circumventing the turbine 32. In other words, the supercharger 3 becomes anon-supercharging state of not executing the supercharging when the bypass passage 71 is opened by the wastegate valve 34.

The automatic transmission 4 has an input shaft 41 connected to the crankshaft 21 by way of a torque converter 8, and an output shaft 42 connected to left and right drive wheels 10 by way of a differential gear 9. The automatic transmission 4 changes the change gear ratio under the control of the vehicle control device 5.

In the first embodiment, the automatic transmission 4 is configured by a stepped automatic transmission in which the change gear ratio is changed in multiple steps by switching engagement and release of a plurality of engagement devices. The engagement device is, for example, a clutch that connects rotation elements, and a brake that regulates the rotation of the rotation element.

The vehicle control device 5 is configured using an electronic control unit (ECU) including a computer, and controls the operation of each unit of the vehicle 1 based on signals and the like from the various types of sensors mounted on the vehicle 1.

As illustrated in FIG. 1, the various types of sensors include a crank position sensor 11 that detects a rotation position of the crankshaft 21, an air flowmeter 12 that detects a flow rate of the air taken into the intake tube 6, a pressure detection sensor 13 that detects the pressure (super-charging pressure by the supercharger 3) in the intake tube 6, an accelerator opening sensor 14 that detects an accelerator opening, a vehicle speed sensor 15 that detects a vehicle speed of the vehicle 1, and the like.

The substantial parts of the embodiment will be mainly described for the configuration (function) of the vehicle control device 5. In FIG. 1, only the substantial parts of the embodiment are illustrated for the configuration of the vehicle control device 5.

Configuration of Vehicle Control Device

As illustrated in FIG. 1, the vehicle control device 5 includes a change gear ratio determination unit (change gear ratio determination circuit) 51, a change gear ratio changing unit (change gear ratio changing circuit) 52, a combustion mode determination unit (combustion mode determination circuit) 53, a combustion mode switching unit (combustion mode switching circuit) 54, and a change regulating unit (change regulating circuit) 55.

The change gear ratio determination unit 51 references a change gear diagrammatic view (not illustrated) illustrating a shift pattern, corresponding to a vehicle speed and an accelerator opening, based on the vehicle speed detected by the vehicle speed sensor 15 and the accelerator opening detected by the accelerator opening sensor 14 to determine whether or not an up-shift condition for executing the up-shift of the change gear ratio in the automatic transmission 4 is satisfied. The change gear diagrammatic view is stored in a memory (not illustrated).

The change gear ratio changing unit 52 controls the operation of the automatic transmission 4 to change the change gear ratio.

The combustion mode determination unit 53 presumes an engine operation to transition to in the future based on an engine operation point (combination of engine rotation number and engine torque) at the current time point, the accelerator opening, and the determination result of the change gear ratio determination unit 51. The combustion mode determination unit 53 references a combustion mode map based on the engine operation point at the current time point and the presumed engine operation point to determine whether or not a switching condition for switching the combustion mode is satisfied. The combustion mode map is stored in the memory (not illustrated).

Figure 2:
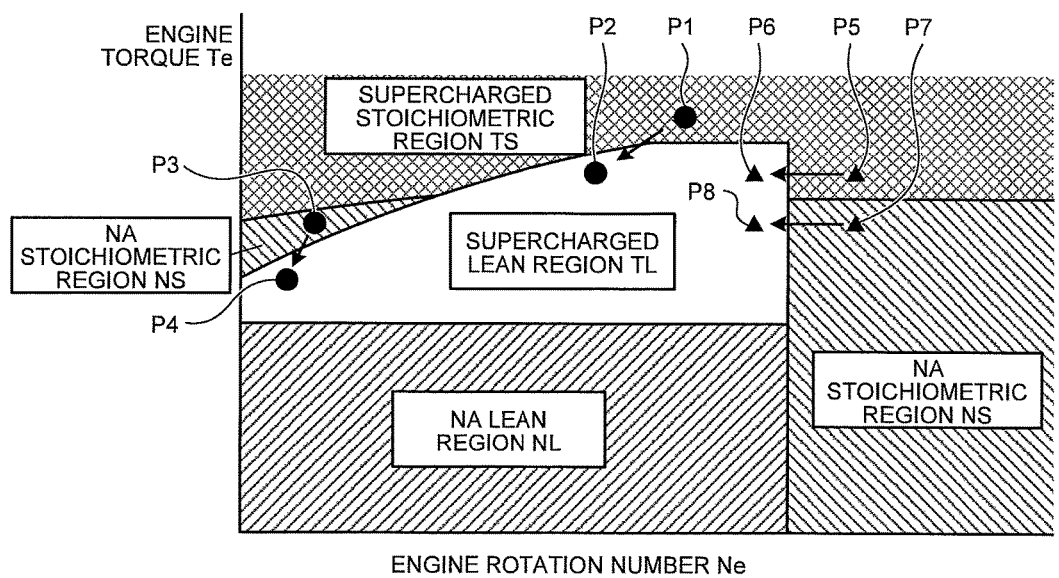
FIG. 2 is a diagram illustrating one example of a combustion mode map according to the first embodiment of the present invention.

FIG. 2 is a diagram illustrating one example of the combustion mode map. Specifically, in FIG. 2, a horizontal axis indicates an engine rotation number Ne and a vertical axis indicates an engine torque Te. In FIG. 2, a correspondence relationship of the engine operation point, which is the combination of the engine rotation number Ne and the engine torque Te, and the combustion mode of the engine 2 selected at the relevant operation point is illustrated.

In the first embodiment, the engine 2 has four combustion modes, an NA stoichiometric combustion mode, a supercharged stoichiometric combustion mode, an NA lean combustion mode, and a supercharged lean combustion mode.

The NA stoichiometric combustion mode is a combustion mode selected at an engine operation point of an NA stoichiometric region NS (FIG. 2), and is a combustion mode in which an air-fuel ratio of the engine 2 is made a stoichiometric air-fuel ratio (theoretical air-fuel ratio) on a rich side than a lean air-fuel ratio with the supercharging by the supercharger 3 stopped. For example, the stoichiometric air-fuel ratio is "14.7".

The supercharged stoichiometric combustion mode is a combustion mode selected at an engine operation point of a supercharged stoichiometric region TS (FIG. 2), and is a combustion mode in which the air-fuel ratio of the engine 2 is made a stoichiometric air-fuel ratio while executing the supercharging by the supercharger 3.

The NA lean combustion mode is a combustion mode selected at an engine operation point of an NA lean region NL (FIG. 2), and is a combustion mode in which the air-fuel ratio of the engine 2 is made a lean air-fuel ratio with the supercharging by the supercharger 3 stopped. For example, the lean air-fuel ratio is "15.5 to 25".

The supercharged lean combustion mode is a combustion mode selected at an engine operation point of a supercharged lean region TL (FIG. 2) adjacent to all of the above regions NS, TS, NL, and is a combustion mode in which the air-fuel ratio of the engine 2 is made the lean air-fuel ratio while executing the supercharging by the supercharger 3.

When determined that the switching condition is satisfied by the combustion mode determination unit 53, the combustion mode switching unit 54 determines the air-fuel ratio of the engine 2 and the operation state of the supercharger 3 corresponding to the combustion mode intended to be switched to. The combustion mode switching unit 54 controls (intake control, fuel injection control, ignition control, etc.) the engine 2 and also controls the operation of the supercharger 3 to switch the combustion mode of the engine 2 to the combustion mode intended to be switched to.

In the first embodiment, the combustion mode determination unit 53 determines whether or not the switching condition for switching from the supercharged stoichiometric combustion mode to the supercharged lean combustion mode is satisfied. When determined that the switching condition is satisfied by the combustion mode determination unit 53, the combustion mode switching unit 54 switches to the supercharged lean combustion mode when the supercharging pressure reaches the required supercharging pressure required in the supercharged lean combustion mode while monitoring the supercharging pressure by the supercharger 3 detected by the pressure detection sensor 13.

When determined that the up-shift condition is satisfied by the change gear ratio determination unit 51 and when determined that the switching condition (switching condition from the supercharged stoichiometric combustion mode to the supercharged lean combustion mode) is satisfied by the combustion mode determination unit 53, the change regulating unit 55 regulates the execution of the up-shift by the change gear ratio changing unit 52.

After regulating the execution of the up-shift, the change regulating unit 55 allows the execution of the up-shift by the change gear ratio changing unit 52 when the supercharging pressure reaches the required supercharging pressure required in the supercharged lean combustion mode while monitoring the supercharging pressure by the supercharger 3 detected by the pressure detection sensor 13.

Operation of Vehicle Control Device

The operation of the vehicle control device 5 described above will now be described.

Among the operations of the vehicle control device 5, the operation of regulating the execution of the up-shift when both conditions, the up-shift condition and the switching condition, are satisfied under a situation the driver of the vehicle 1 released the accelerator will be hereinafter described.

Figure 3:
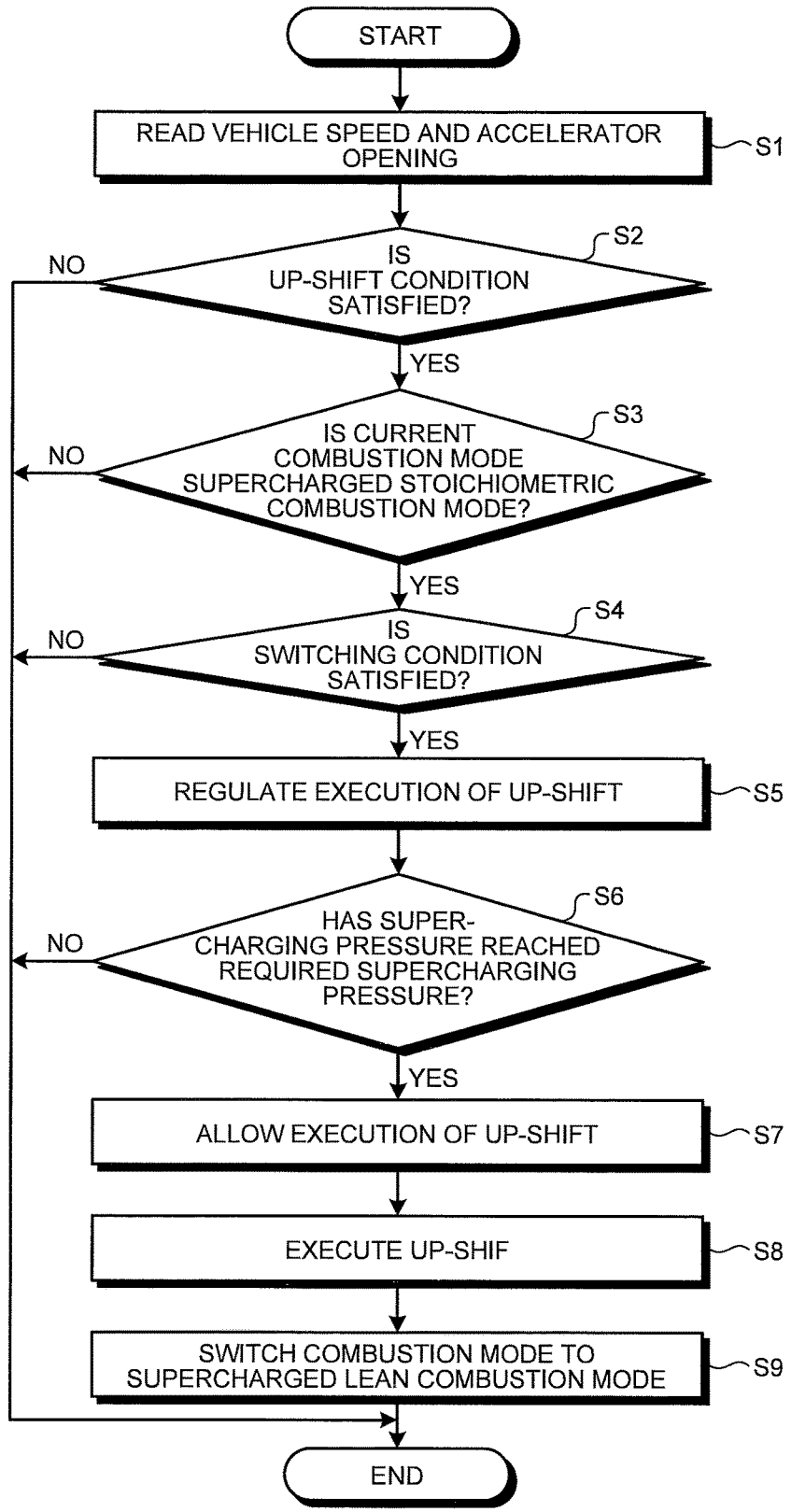
FIG. 3 is a flowchart illustrating one example of an operation of the vehicle control device illustrated in FIG. 1.

FIG. 3 is a flowchart illustrating one example of an operation of the vehicle control device 5.

First, the change gear ratio determination unit 51 reads the vehicle speed and the accelerator opening from the vehicle speed sensor 15 and the accelerator opening sensor 14, respectively (step S1).

Then, the change gear ratio determination unit 51 references the change gear diagrammatic view (not illustrated) based on the read vehicle speed and accelerator opening to determine whether or not the up-shift condition is satisfied (step S2).

When determined that the up-shift condition is not satisfied (step S2: No), the vehicle control device 5 terminates the present control flow (FIG. 3). The present control flow is repeatedly executed at a predetermined interval.

When determined that the up-shift condition is satisfied (step S2: Yes), the combustion mode determination unit 53 references the combustion mode map based on the engine operation point at the current time point to determine whether or not the current combustion mode of the engine 2 is the supercharged stoichiometric combustion mode (step S3).

When determined as currently not the supercharged stoichiometric combustion mode (step S3: No), the vehicle control device 5 terminates the present control flow.

When determined as currently the supercharged stoichiometric combustion mode (step S3: Yes), the combustion mode determination unit 53 presumes the engine operation point to transition to in the future based on the engine operation point at the current time point, the accelerator opening, and the determination result of step S2. The combustion mode determination unit 53 references the combustion mode map based on the engine operation point at the current time point and the presumed engine operation point to determine whether or not the switching condition for switching from the supercharged stoichiometric combustion mode to the supercharged lean combustion mode is satisfied (step S4).

For example, it is assumed that a case in which the engine operation point at the current time point is an engine operation point P1 illustrated in FIG. 2 in the supercharged stoichiometric region TS, as illustrated in FIG. 2. When the up-shift is executed, the engine torque Te and the engine rotation number Ne decrease. Thus, when determined that the up-shift condition is satisfied (step S2: Yes) in the above case, the combustion mode determination unit 53 presumes that the engine operation point P1 at the current time point will change toward low torque and low rotation number to transition to an engine operation point P2 illustrated in FIG. 2 in the supercharged lean region TL. The combustion mode determination unit 53 references the combustion mode map based on the engine operation point P1 at the current time point and the presumed engine operation point P2 to determine that the switching condition is satisfied (step S4: Yes).

When determined that the switching condition is satisfied (step S4: Yes), the vehicle control device 5 proceeds to step S5.

When determined that the switching condition is not satisfied (step S4: No), the vehicle control device 5 terminates the present control flow.

In step S5, the change regulating unit 55 regulates the execution of the up-shift of the change gear ratio by the change gear ratio changing unit 52.

Then, the change regulating unit 55 monitors the supercharging pressure by the supercharger 3 detected by the pressure detection sensor 13, and determines whether or not the supercharging pressure reached the required supercharging pressure required in the supercharged lean combustion mode (step S6).

When determined that the supercharging pressure has not reached the required supercharging pressure (step S6: No), the vehicle control device 5 terminates the present control flow.

When determined that the supercharging pressure reached the required supercharging pressure (step S6: Yes), the change regulating unit 55 allows the execution of the up-shift by the change gear ratio changing unit 52 (step S7).

The change gear ratio changing unit 52 then controls the operation of the automatic transmission 4 to execute the up-shift (step S8).

The combustion mode switching unit 54 then switches the combustion mode of the engine 2 from the supercharged stoichiometric combustion mode to the supercharged lean combustion mode (step S9). Thereafter, the vehicle control device 5 terminates the present control flow.

Comparison with Conventional Operation

Figure 4:
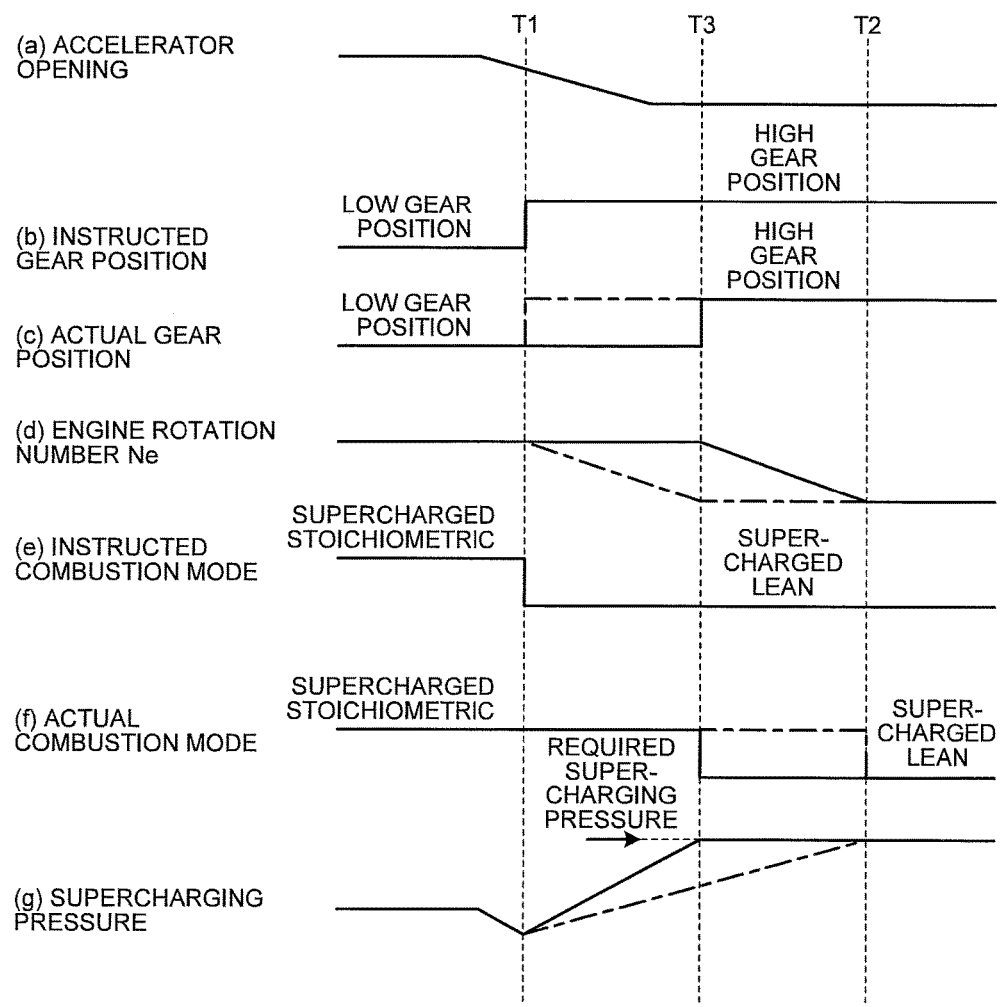

The operation will now be compared with the conventional operation with reference to FIG. 4 for the behavior of the engine rotation number Ne by the operation of the vehicle control device 5 illustrated in FIG. 3, the supercharging pressure by the supercharger 3, and the like.

FIG. 4 is a timing charge illustrating the behavior of the engine rotation number Ne by the operation of the vehicle control device 5 illustrated in FIG. 3, the supercharging pressure by the supercharger 3, and the like. Specifically, FIG. 4(a) illustrates the behavior of the accelerator opening. FIG. 4(b) illustrates the determination result of the change gear ratio determination unit 51 (described as "instructed gear position" in FIG. 4(b)), and illustrates that the up-shift condition is satisfied at the rise from a "low gear position" state to a "high gear position" state. FIG. 4(c) illustrates the state of an actual change gear ratio (described as "actual gear position" in FIG. 4(c)) in the automatic transmission 4. FIG. 4(d) illustrates the behavior of the engine rotation number Ne. FIG. 4(e) illustrates the determination result (described as "instructed combustion mode" in FIG. 4(e)) of the combustion mode determination unit 53, and illustrates that the switching condition is satisfied at the fall from a "supercharged stoichiometric" state to a "supercharged lean" state. FIG. 4(f) illustrates the state of an actual combustion mode in the engine 2 (described as "actual combustion mode" in FIG. 4(f)). FIG. 4(g) illustrates the behavior of the supercharging pressure by the supercharger 3.

In FIG. 4, a case in which the up-shift condition is satisfied (FIG. 4(b)) and the switching condition is satisfied (FIG. 4(e)) at a time point (timing T1) the driver of the vehicle 1 released the accelerator and the accelerator opening (FIG. 4(a)) reduced is illustrated.

The conventional vehicle control device executes the up-shift (change from "low gear position" to "high gear position") at the timing T1 the up-shift condition is satisfied, as described with a chain dashed line in FIG. 4(c). With the execution of the up-shift, the engine rotation number Ne starts to decrease after the timing T1, as illustrated with a chain dashed line in FIG. 4(d). As a result, the rise in the supercharging pressure by the supercharger 3 is delayed after the timing T1, and hence time is required until reaching the required supercharging pressure (timing T2) required in the supercharged lean combustion mode, as illustrated with a chain dashed line in FIG. 4(g). In other words, from the timing T1 the switching condition is satisfied until the timing T2 the supercharging pressure reaches the required supercharging pressure, the combustion mode cannot be switched to the supercharged lean combustion mode and the supercharged stoichiometric combustion mode needs to be maintained, as illustrated with a chain dashed line in FIG. 4(f).

Since both conditions of the up-shift condition and the switching condition are satisfied at the timing T1, the vehicle control device 5 according to the first embodiment regulates the execution of the up-shift, as illustrated with a solid line in FIG. 4(c). The engine rotation number Ne does not start to decrease after the timing T1, as illustrated with a solid line in FIG. 4(d), with the regulation of the execution of the up-shift. As a result, the supercharging pressure by the supercharger 3 rapidly rises compared to the prior art after the timing T1, and reaches the required supercharging pressure at timing T3 earlier than the timing T2, as illustrated with a solid line in FIG. 4(g). In other words, as illustrated with a solid line in FIG. 4(f), the combustion mode can be switched to the supercharged lean combustion mode at the timing T3 earlier than the timing T2. The vehicle control device 5 executes the up-shift at the timing T3, as illustrated with a solid line in FIG. 4(c).

When both conditions of the up-shift condition and the switching condition are satisfied, the vehicle control device 5 according to the first embodiment described above regulates the execution of the up-shift. Thus, the decrease of the engine rotation number Ne accompanying the execution of the up-shift can be avoided, the supercharging pressure can be rapidly raised, and the delay in the transition to the supercharged lean combustion mode can be suppressed.

Therefore, the vehicle control device 5 according to the first embodiment has an effect of being able to suppress the lowering of the fuel efficiency.

The vehicle control device 5 executes the up-shift at the timing (timing T3) the supercharging pressure by the supercharger 3 reaches the required supercharging pressure. In other words, the vehicle control device 5 regulates the execution of the up-shift until the supercharging pressure reaches the required supercharging pressure. Thus, compared to the configuration of executing the up-shift before the supercharging pressure reaches the required supercharging pressure after both conditions of the up-shift condition and the switching condition are satisfied, the time until the supercharging pressure reaches the required supercharging pressure after both conditions are satisfied can be reduced. In other words, the switch to the supercharged lean combustion mode can be executed in a short period of time.

Modification of First Embodiment

In the first embodiment described above, a case of switching from the supercharged stoichiometric combustion mode to the supercharged lean combustion mode has been described, but this is not the sole case, and the first embodiment may be applied to a case of switching from the NA stoichiometric combustion mode to the supercharged lean combustion mode (e.g., when the engine operation point is presumed to transition from an engine operation point P3 (FIG. 2) to an engine operation point P4 (FIG. 2)).

In the timing chart illustrated in FIG. 4, the execution of the up-shift is regulated when the up-shift condition and the switching condition are simultaneously satisfied, but this is not the sole case. For example, even if the timing the up-shift condition is satisfied and the timing the switching condition is satisfied are not simultaneous, the execution of the up-shift may be regulated if the interval of both of such timings is within a predetermined period.

In the first embodiment described above, the up-shift is executed at the timing the supercharging pressure reaches the required supercharging pressure, but this is not the sole case, and the up-shift may be executed before the supercharging pressure reaches the required supercharging pressure after both conditions of the up-shift condition and the switching condition are satisfied.

Second Embodiment

A second embodiment of the present invention will now be described.

In the following description, the same reference numerals are denoted on the configurations and steps similar to the first embodiment described above, and the detailed description thereof will be omitted or simplified.

The vehicle control device 5 according to the first embodiment described above regulates the execution of the up-shift when both conditions, the up-shift condition and the switching condition, are satisfied under a situation the driver of the vehicle 1 released the accelerator.

On the contrary, a vehicle control device according to the second embodiment regulates the execution of the up-shift when the up-shift condition is satisfied and the switching condition is satisfied (e.g., when the engine operation point is presumed to transition from an engine operation point P5 (FIG. 2) to an engine operation point P6 (FIG. 2)) under a situation the accelerator is constant and the vehicle speed is increasing.

The configuration of the vehicle according to the second embodiment is a configuration similar to the first embodiment described above.

Hereinafter, only the operation of the vehicle control device 5 according to the second embodiment will be described.

Operation of Vehicle Control Device

Figure 5:
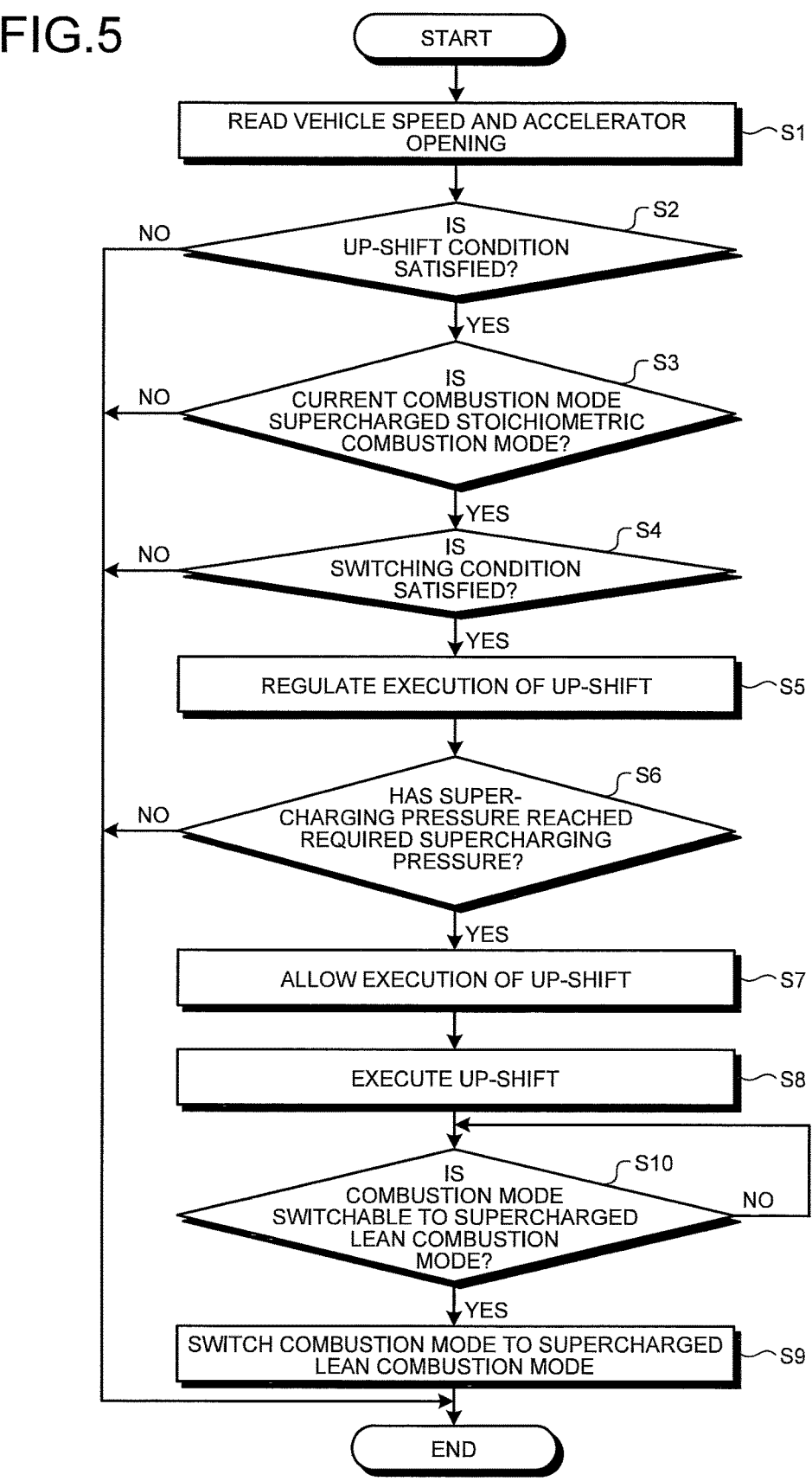
FIG. 5 is a flowchart illustrating one example of an operation of a vehicle control device according to a second embodiment of the present invention.

FIG. 5 is a flowchart illustrating one example of an operation of the vehicle control device 5 according to the second embodiment of the present invention.

As illustrated in FIG. 5, the operation of the vehicle control device 5 according to the second embodiment differs from the operation (FIG. 3) of the vehicle control device 5 described in the first embodiment only in that step S10 is added. Thus, only step S10 will be described below.

Step S10 is executed after step S8.

Specifically, in step S10, the combustion mode switching unit 54 monitors the engine operation point of after the up-shift is executed in step S8, and references the combustion mode map to determine whether or not the relevant engine operation point is included in the supercharged lean region TL (whether or not the combustion mode of the engine 2 can be switched to the supercharged lean combustion mode).

When determined as not switchable to the supercharged lean combustion mode (step S10: No), the combustion mode switching unit 54 continues to monitor the engine operation point until the engine operation point is included in the supercharged lean region TL.

When determined as switchable to the supercharged lean combustion mode (step S10: Yes), the vehicle control device 5 proceeds to step S9.

Comparison with Conventional Operation

Figure 6:
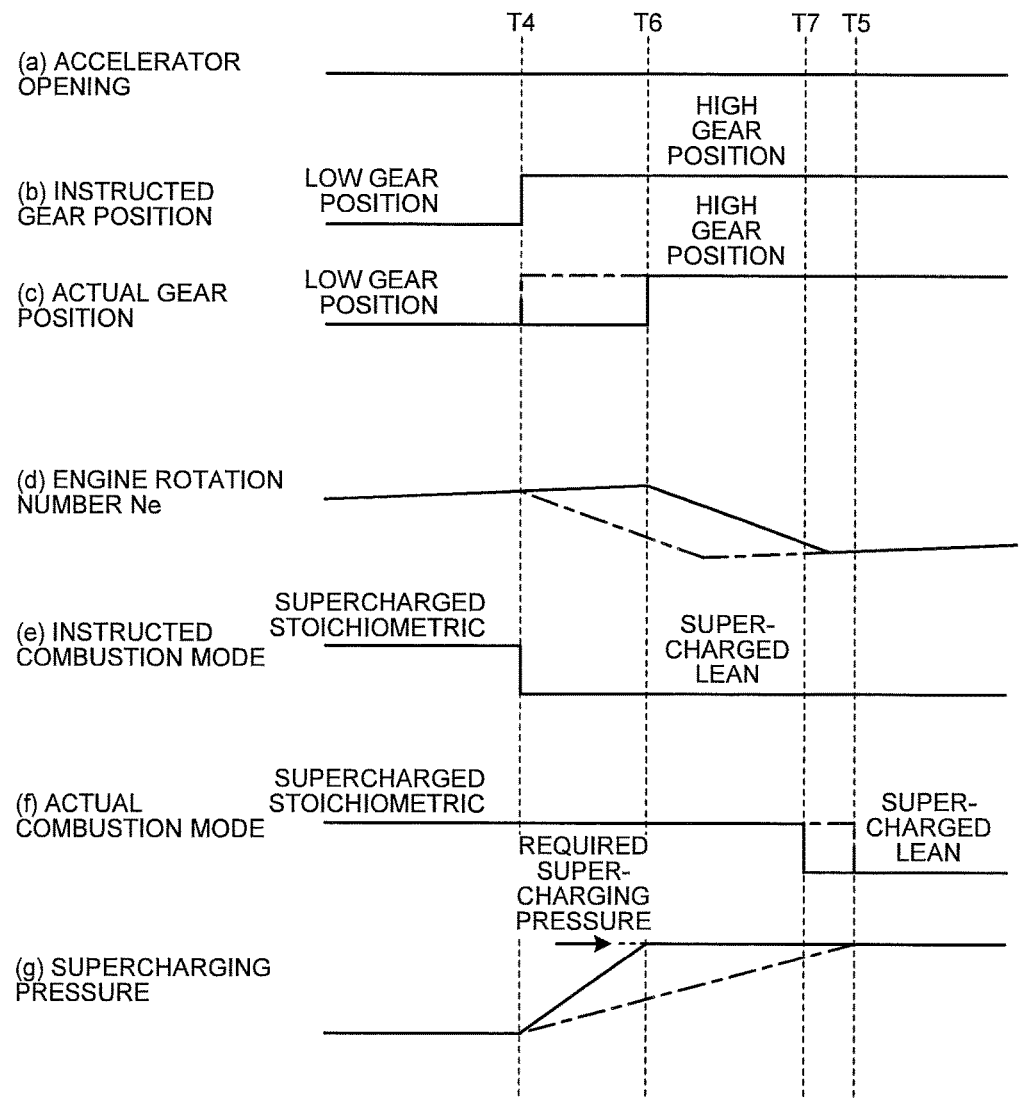

The operation will now be compared with the conventional operation with reference to FIG. 6 for the behavior of the engine rotation number Ne by the operation of the vehicle control device 5 illustrated in FIG. 5, the supercharging pressure by the supercharger 3, and the like.

FIG. 6 is a timing chart illustrating the behavior of the engine rotation number Ne by the operation of the vehicle control device 5 illustrated in FIG. 5, the supercharging pressure by the supercharger 3, and the like. Specifically, FIG. 6(a) to FIG. 6(g) are diagrams corresponding to FIG. 4(a) to FIG. 4(g).

In FIG. 6, a case in which the up-shift condition is satisfied (FIG. 6(b)) and the switching condition is satisfied (FIG. 6(e)) at a time point (timing T4) the driver of the vehicle 1 is maintaining the accelerator opening constant (FIG. 6(a)) but the vehicle speed is increasing (engine rotation number Ne (FIG. 6(d)) is increasing) is illustrated.

As illustrated with a chain dashed line in FIG. 6(c), the conventional vehicle control device executes the up-shift at the timing T4 the up-shift condition is satisfied. As described in "comparison with conventional operation" in the first embodiment described above, the engine rotation number Ne is decreased (illustrated with a chain dashed line in FIG. 6(d)) and the rise in the supercharging pressure is delayed (illustrated with a chain dashed line in FIG. 6(g)) by the execution of the up-shift. In other words, as illustrated with a chain dashed line in FIG. 6(f), time is required from the timing T4 the switching condition is satisfied until a timing T5 switch is made to the supercharged lean combustion mode (timing the supercharging pressure reaches the required supercharging pressure).

Since both conditions of the up-shift condition and the switching condition are satisfied at the timing T4, the vehicle control device 5 according to the second embodiment regulates the execution of the up-shift, as illustrated with a solid line in FIG. 6(c). The engine rotation number Ne continues to increase, as illustrated with a solid line in FIG. 6(d), with the regulation of the execution of the up-shift. As a result, the supercharging pressure by the supercharger 3 rapidly rises compared to the prior art after the timing T4, and reaches the required supercharging pressure at a timing T6 earlier than the timing T5, as illustrated with a solid line in FIG. 6(g). The vehicle control device 5 executes the up-shift at the timing T6 (illustrated with a solid line in FIG. 6(c)), and switches to the supercharged lean combustion mode at a timing T7 the engine operation point, which is the combination of the engine rotation number Ne and the engine torque Te, of after the execution of the up-shift is included in the supercharged lean region TL. Even if switched to the supercharged lean combustion mode in such manner, the timing T7 to switch becomes a timing earlier than the conventional timing T5.

The effects similar to the first embodiment are obtained even in the configuration of regulating the execution of the up-shift when both conditions of the up-shift condition and the switching condition are satisfied under a situation the accelerator is constant and the vehicle speed is increasing as in the second embodiment described above.

Modification of Second Embodiment

In the second embodiment described above, a case of switching from the supercharged stoichiometric combustion mode to the supercharged lean combustion mode has been described, but this is not the sole case, and the second embodiment may be applied to a case of switching from the NA stoichiometric combustion mode to the supercharged lean combustion mode (e.g. when the engine operation point is presumed to transition from an engine operation point P7 (FIG. 2) to an engine operation point P8 (FIG. 2)).

In the timing chart illustrated in FIG. 6, the execution of the up-shift is regulated when the up-shift condition and the switching condition are simultaneously satisfied, but this is not the sole case. For example, even if the timing the up-shift condition is satisfied and the timing the switching condition is satisfied are not simultaneous, the execution of the up-shift may be regulated if the interval of both of such timings is within a predetermined period.

In the second embodiment described above, the up-shift is executed at the timing the supercharging pressure reaches the required supercharging pressure, but this is not the sole case, and the up-shift may be executed before the supercharging pressure reaches the required supercharging pressure after both conditions of the up-shift condition and the switching condition are satisfied.

Third Embodiment

A third embodiment of the present invention will now be described.

In the following description, the same reference numerals are denoted on the configurations and steps similar to the second embodiment described above, and the detailed description will be omitted or simplified.

In the second embodiment and the modification thereof described above, the combustion mode before switching to the supercharged lean combustion mode is the supercharged stoichiometric combustion mode or the NA stoichiometric combustion mode.

In the third embodiment, on the other hand, the combustion mode before switching to the supercharged lean combustion mode is the combustion mode (hereinafter referred to as rich spike combustion mode) of executing a rich spike control of purifying the nitrogen oxide occluded in a catalyst.

Configuration of Vehicle

Figure 7:
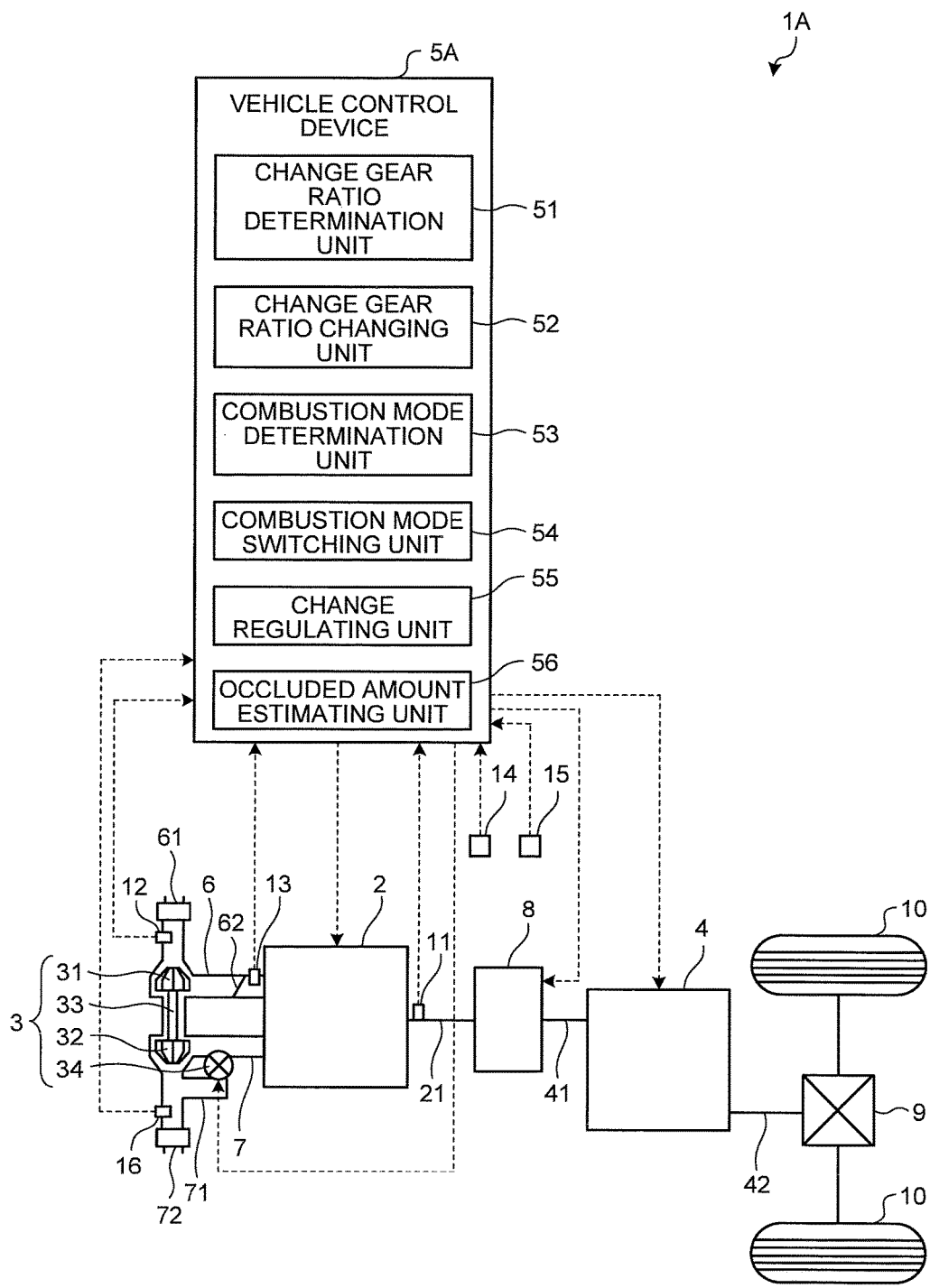
FIG. 7 is a diagram schematically illustrating a configuration of a vehicle according to a third embodiment of the present invention.

FIG. 7 is a diagram schematically illustrating a configuration of a vehicle 1A according to a third embodiment of the present invention.

As illustrated in FIG. 7, in the vehicle 1A according to the third embodiment, a catalyst 72 and a catalyst bed temperature detection sensor 16 are added with respect to the vehicle 1 (FIG. 1) described in the second embodiment described above, and the function of a part of the vehicle control device 5 is changed.

The catalyst 72 is configured using an occlusion/reduction type NOx catalyst in which the occlusion and reduction of the nitrogen oxide can be carried out, and is arranged in the exhaust tube 7, as illustrated in FIG. 7. The catalyst 72 occludes the nitrogen oxide in the exhaust gas, and purifies the exhaust gas.

The catalyst bed temperature detection sensor 16 is arranged in the catalyst 72, and detects the catalyst bed temperature that changes according to the reaction heat of when the exhaust gas reacts in the catalyst 72.

In a vehicle control device 5A according to the third embodiment, an occluded amount estimating unit (occluded amount estimating circuit) 56 is added with respect to the vehicle control device 5 (FIG. 1) described in the second embodiment.

The occluded amount estimating unit 56 references a relationship (not illustrated) in which the change in the catalyst bed temperature and the occluded amount of the nitrogen oxide (hereinafter referred to as NOx occluded amount) are corresponded based on the catalyst bed temperature detected by the catalyst bed temperature detection sensor 16, and estimates the NOx occluded amount occluded in the catalyst 72. Such relationship is stored in a memory (not illustrated).

When the supercharged lean combustion mode is executed in the combustion mode switching unit 54, the combustion mode determination unit 53 according to the third embodiment carries out a start determination of starting the rich spike combustion mode or a termination determination of terminating the rich spike combustion mode based on the NOx occluded amount estimated by the occluded amount estimating unit 56. The combustion mode determination unit 53 also determines whether or not the switching condition is satisfied, similar to the combustion mode determination unit 53 described in the second embodiment.

When the start determination of the rich spike combustion mode is made in the combustion mode determination unit 53 during the execution of the supercharged lean combustion mode, the combustion mode switching unit 54 according to the third embodiment executes the rich spike control (switches to the rich spike combustion mode).

Specifically, the rich spike control is a control of temporarily making the air-fuel ratio of the engine 2 to the air-fuel ratio on the rich side than the lean air-fuel ratio and lagging the ignition timing of the engine 2. The nitrogen oxide occluded in the catalyst 72 is reduced to nitrogen and the purifying ability of the catalyst 72 (ability to occlude the nitrogen oxide) is recovered by making the air-fuel ratio to the air-fuel ratio on the rich side in the rich spike control.

When the termination determination of the rich spike combustion mode is made in the combustion mode determination unit 53 and determination is made that the switching condition is satisfied, the combustion mode switching unit 54 terminates the rich spike control and switches to the supercharged lean combustion mode.

Operation of Vehicle Control Device

An operation of the vehicle control device 5A according to the third embodiment will now be described.

Figure 8:
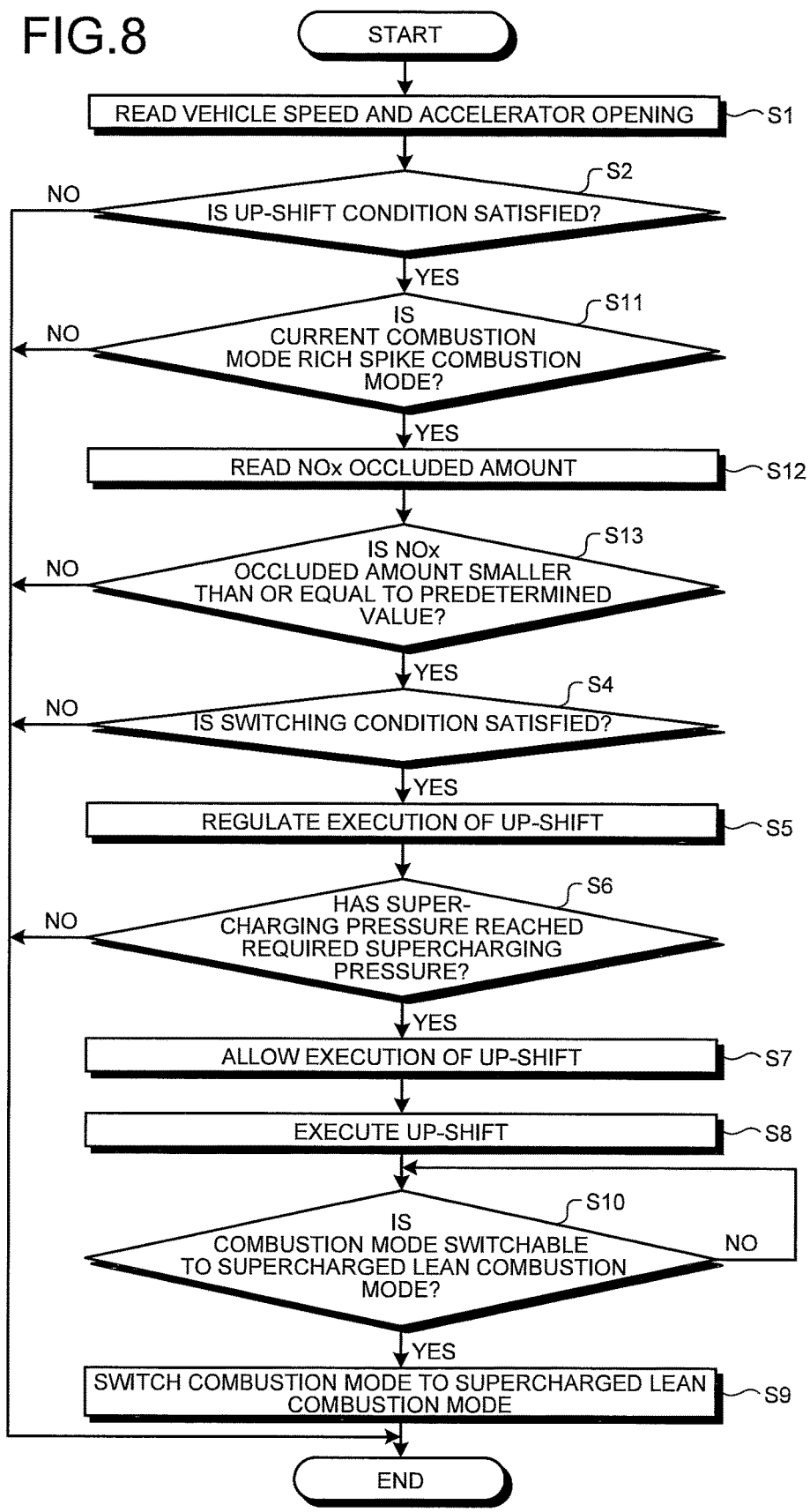
FIG. 8 is a flowchart illustrating one example of an operation of the vehicle control device illustrated in FIG. 7.

FIG. 8 is a flowchart illustrating one example of an operation of the vehicle control device 5A.

As illustrated in FIG. 8, the operation of the vehicle control device 5A according to the third embodiment differs from the operation (FIG. 5) of the vehicle control device 5 described in the second embodiment in that step S3 is omitted and steps S11 to S13 are added. Thus, only the steps S11 to S13 will be described below.

Step S11 is executed when determined that the up-shift condition is satisfied in step S2 (step S2: Yes).

Specifically, the combustion mode determination unit 53 determines whether or not the rich spike control is currently executed in the combustion mode switching unit 54 (whether or not the current combustion mode of the engine 2 is the rich spike combustion mode) in step S11.

When determined as currently not the rich spike combustion mode (step S11: No), the vehicle control device 5A terminates the present control flow.

When determined as currently the rich spike combustion mode (step S11: Yes), the combustion mode determination unit 53 reads the NOx occluded amount estimated by the occluded amount estimating unit 56 (step S12).

Then, the combustion mode determination unit 53 determines whether or not the read NOx occluded amount is smaller than or equal to a predetermined value (rich spike terminating occluded amount of terminating the rich spike control) (whether or not to terminate the rich spike combustion mode) (step S13).

When determined that the NOx occluded amount is not smaller than or equal to the predetermined value (not terminate the rich spike combustion mode) (step S13: No), the vehicle control device 5A terminates the present control flow.

When determined that the NOx occluded amount is smaller than or equal to the predetermined value (termination determination of the rich spike combustion mode) (step S13: Yes), the vehicle control device 5A proceeds to step S4.

Comparison with Conventional Operation

Figure 9:
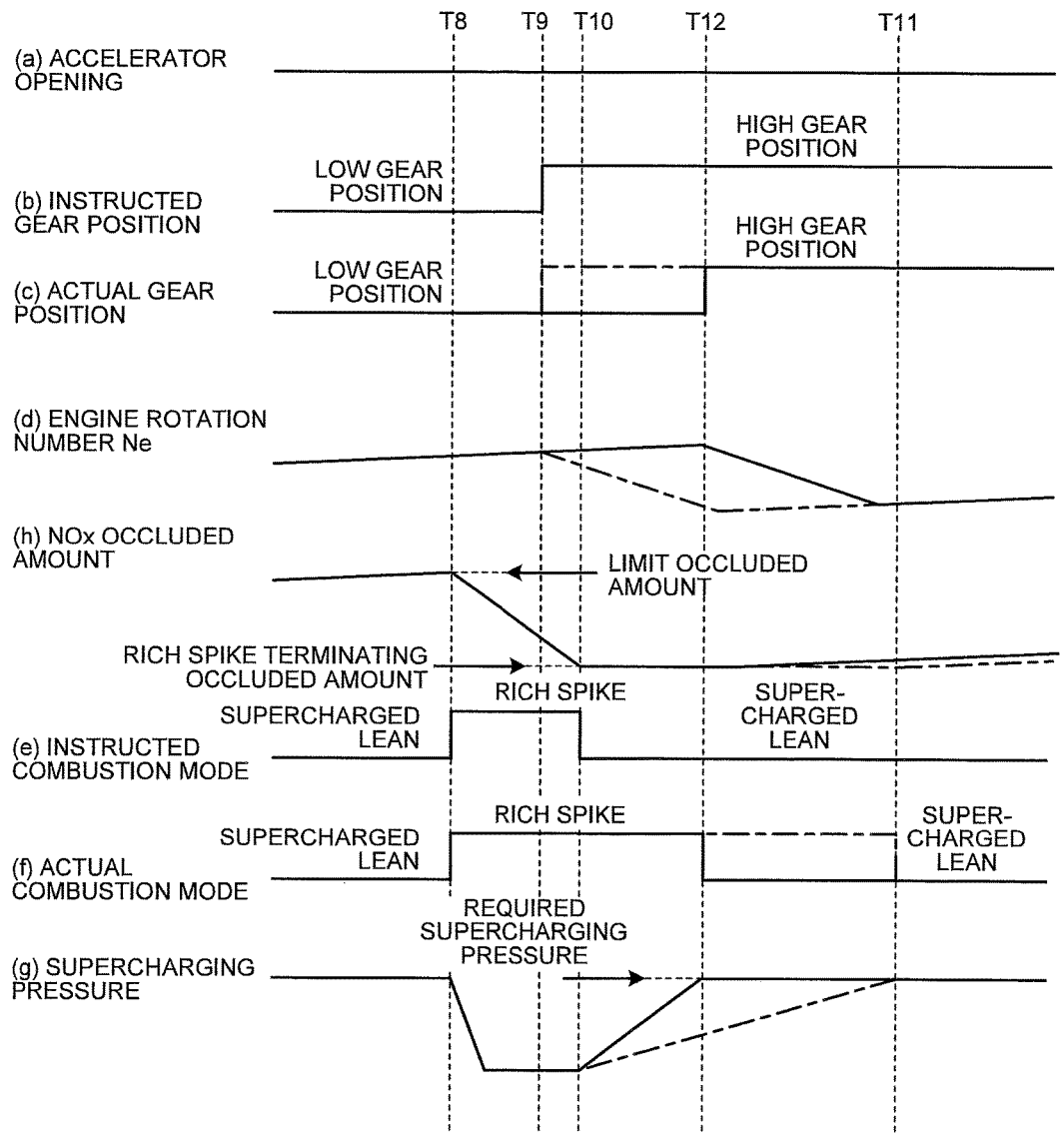

The operation will now be compared with the conventional operation with reference to FIG. 9 for the behavior of the engine rotation number Ne by the operation of the vehicle control device 5A illustrated in FIG. 8, the NOx occluded amount, the supercharging pressure by the supercharger 3, and the like.

FIG. 9 is a timing chart illustrating the behavior of the engine rotation number Ne by the operation of the vehicle control device 5A illustrated in FIG. 8, the NOx occluded amount, the supercharging pressure by the supercharger 3, and the like. Specifically, FIG. 9(a) to FIG. 9(g) are diagrams corresponding to FIG. 6(a) to FIG. 6(g). FIG. 9(e) illustrates that the start determination to the rich spike combustion mode is made at the rise from the "supercharged lean" state to the "rich spike" state, the termination determination of the rich spike combustion mode is made at the fall from the "rich spike" state to the "supercharged lean" state, and the switching condition is satisfied. FIG. 9(h) illustrates the behavior of the NOx occluded amount.

In FIG. 9, a case in which the NOx occluded amount reached a limit occluded amount (FIG. 9(h)) and the start determination to the rich spike combustion mode is made at a timing T8 is illustrated. Furthermore, in FIG. 9, a case in which the up-shift condition is satisfied (FIG. 9(b)) at a time point (timing T9 after the timing T8) the driver of the vehicle 1A is maintaining the accelerator constant but the vehicle speed is increasing (engine rotation number Ne (FIG. 9(d)) is increasing) is illustrated. Furthermore, in FIG. 9, a case in which the NOx occluded amount becomes smaller than or equal to the rich spike terminating occluded amount (FIG. 9(h)), the termination determination of the rich spike combustion mode is made, and the switching condition is satisfied (FIG. 9(e)) at a timing T10 after the timing T9 is illustrated.

As illustrated with a chain dashed line in FIG. 9(c), the conventional vehicle control device executes the up-shift at the timing T9 the up-shift condition is satisfied. As described in "comparison with conventional operation" in the second embodiment described above, the engine rotation number Ne decreases (illustrated with a chain dashed line in FIG. 9(d)) and the rise in the supercharging pressure delays (illustrated with a chain dashed line in FIG. 9(g)) by the execution of the up-shift. In other words, as illustrated with a chain dashed line in FIG. 9(f), time is required from the timing T10 the termination determination of the rich spike combustion mode is made and the switching condition is satisfied until the timing T11 switch is made to the supercharged lean combustion mode (timing the supercharging pressure reaches the required supercharging pressure). In FIG. 9(h), the behavior in which the NOx occluded amount is maintained at smaller than or equal to the rich spike terminating occluded amount until the timing T11, and the NOx occluded amount is increased after the timing T11 switch is made to the supercharged lean combustion mode as a result of maintaining the rich spike combustion mode until the timing T11 is illustrated with a chain dashed line.

The vehicle control device 5A according to the third embodiment regulates the execution of the up-shift after the timing T9, as illustrated with a solid line in FIG. 9(c), since the termination determination of the rich spike control is made and the switching condition is satisfied (timing T10) within a predetermined period from the timing T9 the up-shift condition is satisfied. The engine rotation number Ne continues to increase, as illustrated with a solid line in FIG. 9(d), with the regulation of the execution of the up-shift. As a result, the supercharging pressure by the supercharger 3 rapidly rises compared to the prior art after the timing T10, and reaches the required supercharging pressure at a timing T12 earlier than the timing T11, as illustrated with a solid line in FIG. 9(g). In other words, the combustion mode can be switched to the supercharged lean combustion mode at the timing T12 earlier than the timing T11, as illustrated with a solid line in FIG. 9(f). As illustrated with a solid line in FIG. 9(c), the vehicle control device 5A executes the up-shift at the timing T12. In FIG. 9(h), the behavior in which the NOx occluded amount increases after the timing T12 as a result of switching to the supercharged lean combustion mode at the timing T12 is illustrated with a solid line.

The effects similar to the second embodiment are obtained even if the present invention is applied when switching from the rich spike combustion mode to the supercharged lean combustion mode as in the third embodiment described above.

Modification of Third Embodiment

In the third embodiment described above, a case in which the up-shift condition is satisfied under a situation the accelerator opening is constant and the vehicle speed is increasing has been illustrated, but this is not the sole case, and the third embodiment may be applied to a case in which the up-shift condition is satisfied under a situation the driver of the vehicle 1A released the accelerator, similar to the first embodiment described above.

In the third embodiment described, the up-shift is executed at the timing the supercharging pressure reaches the required supercharging pressure, but this is not the sole case, and the up-shift may be executed before the supercharging pressure reaches the required supercharging pressure after the up-shift condition is satisfied, the termination determination of the rich spike combustion mode is made, and the switching condition is satisfied.

Fourth Embodiment

A fourth embodiment of the present invention will now be described.

In the following description, the same reference numerals are denoted on the configurations and steps similar to the first embodiment, and the detailed description will be omitted or simplified.

The vehicle control device according to the fourth embodiment differs from the vehicle control device 5 described in the first embodiment in that a down-shift is executed when the execution of the up-shift is regulated.

The configuration of the vehicle according to the fourth embodiment is a configuration similar to the first embodiment.

Only the operation of the vehicle control device 5 according to the fourth embodiment will be described below.

Operation of Vehicle Control Device

Figure 10:
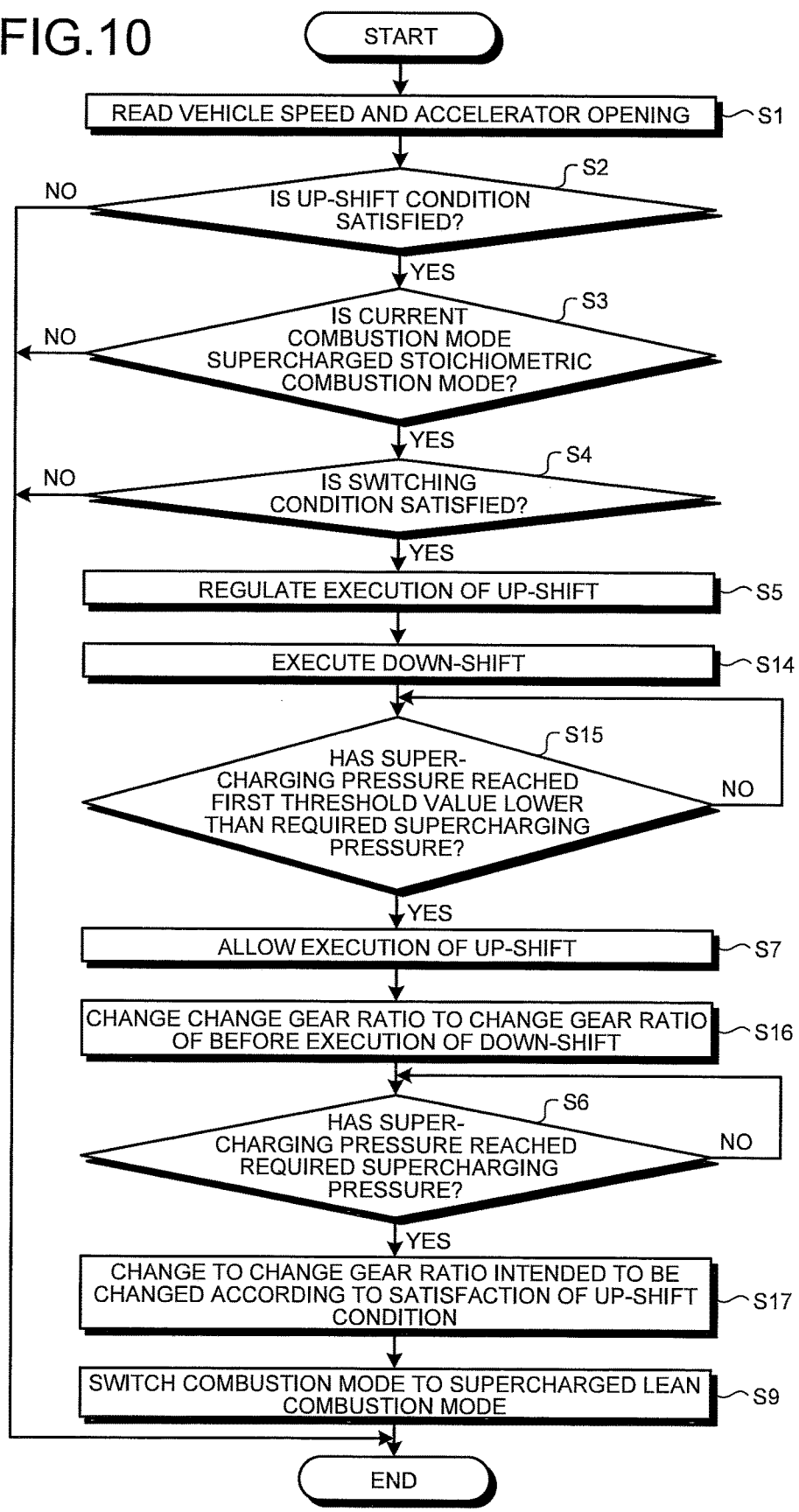
FIG. 10 is a flowchart illustrating one example of an operation of a vehicle control device according to a fourth embodiment of the present invention.

FIG. 10 is a flowchart illustrating one example of an operation of the vehicle control device 5 according to the fourth embodiment of the present invention.

As illustrated in FIG. 10, the operation of the vehicle control device 5 according to the fourth embodiment differs from the operation (FIG. 3) of the vehicle control device 5 described in the first embodiment in that steps S14 to S17 are added. Thus, only steps S14 to S17 will be described below.

Step S14 is executed after step S5.

Specifically, in step S14, a change gear ratio changing unit 52 controls the operation of the automatic transmission 4 to execute the down-shift.

Then, the change regulating unit 55 monitors the supercharging pressure by the supercharger 3 detected by the pressure detection sensor 13, and determines whether or not the supercharging pressure reached a first threshold value lower than the required supercharging pressure required in the supercharged lean combustion mode (step S15).

When determined that the supercharging pressure has not reached the first threshold value (step S15: No), the change regulating unit 55 continues to monitor the supercharging pressure until the supercharging pressure reaches the first threshold value.

When determined that the supercharging pressure reached the first threshold value (step S15: Yes), the vehicle control device 5 proceeds to step S7.

Step S16 is executed after step S7.

Specifically, in step S16, the change gear ratio changing unit 52 controls the operation of the automatic transmission 4 to change the change gear ratio of the automatic transmission 4 to the change gear ratio of before executing the down-shift in step S14. Thereafter, the vehicle control device 5 proceeds to step S6.

Step S17 is executed when determined that the supercharging pressure reached the required supercharging pressure in step S6 (step S6: Yes).

Specifically, in step S17, the change gear ratio changing unit 52 controls the operation of the automatic transmission 4 to change the change gear ratio of the automatic transmission 4 to the change gear ratio (change gear ratio intended to be changed according to whether the up-shift condition is satisfied in step S2) based on the change gear diagrammatic view of when the up-shift condition is satisfied in step S2 (step S2: Yes). Thereafter, the vehicle control device 5 proceeds to step S9.

Comparison with Conventional Operation

Figure 11:
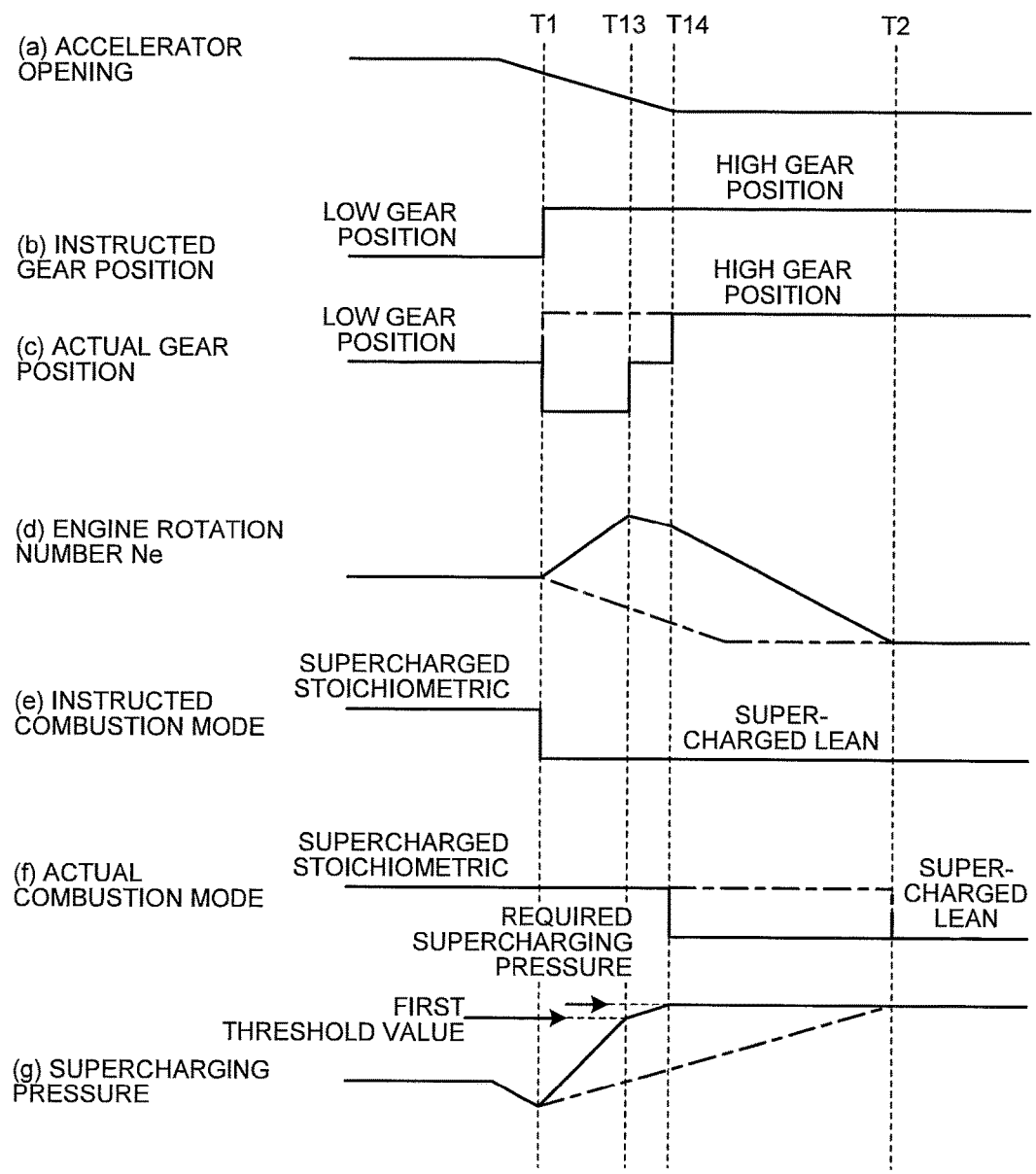

The operation will now be compared with the conventional operation with reference to FIG. 11 for the behavior of the engine rotation number Ne by the operation of the vehicle control device 5 illustrated in FIG. 10, the supercharging pressure by the supercharger 3, and the like.

FIG. 11 is a timing chart illustrating the behavior of the engine rotation number Ne by the operation of the vehicle control device 5 illustrated in FIG. 10, the supercharging pressure by the supercharger 3, and the like. Specifically, FIG. 11(a) to FIG. 11(g) are diagrams corresponding to FIG. 4(a) to FIG. 4(g).

The conventional vehicle control device operates as described in "comparison with conventional operation" in the first embodiment described above. In other words, as illustrated with a chain dashed line in FIG. 11(c), FIG. 11(f), and FIG. 11(g), the conventional vehicle control device executes the up-shift at the timing T1 the up-shift condition is satisfied, and switches to the supercharged lean combustion mode at the timing T2 the supercharging pressure reaches the required supercharging pressure.

Since both conditions of the up-shift condition and the switching condition are satisfied at the timing T1, the vehicle control device 5 according to the fourth embodiment regulates the execution of the up-shift, as illustrated with a solid line in FIG. 11(c). The vehicle control device 5 executes the down-shift at the timing T1. The engine rotation number Ne starts to increase after the timing T1, as illustrated with a solid line in FIG. 11(d), with the execution of the down-shift. As a result, the supercharging pressure by the supercharger 3 rapidly rises compared to the prior art after the timing T1, as illustrated with a solid line in FIG. 11(g). As illustrated with a solid line in FIG. 11(c) and FIG. 11(g), the vehicle control device 5 once returns the change gear ratio to the change gear ratio of before the execution of the down-shift at a timing T13 the supercharging pressure reaches the first threshold value. Even if the change gear ratio is once returned to the change gear ratio of before the execution of the down-shift at the timing T13, the engine rotation number Ne is in a high state, as illustrated with a solid line in FIG. 11(d). Thus, as illustrated with a solid line in FIG. 11(g), the supercharging pressure by the supercharger 3 reaches the required supercharging pressure at a timing T14 much earlier than the timing T2. In other words, as illustrated with a solid line in FIG. 11(f), the combustion mode can be switched to the supercharged lean combustion mode at the timing T14 much earlier than the timing T2. The vehicle control device 5 then executes the originally intended up-shift at the timing T14, as illustrated with a solid line in FIG. 11(c).

The fourth embodiment described above has the following effects in addition to the effects similar to the first embodiment described above.

The vehicle control device 5 according to the fourth embodiment executes the down-shift when the execution of the up-shift is regulated. Thus, the engine rotation number Ne can be increased and the supercharging pressure can be more rapidly raised with the execution of the down-shift, whereby the combustion mode can be switched to the supercharged lean combustion mode at a timing earlier than the first embodiment described above.

Modification of Fourth Embodiment

In the fourth embodiment described above, a case of switching from the supercharged stoichiometric combustion mode to the supercharged lean combustion mode has been described, but this is not the sole case, and the fourth embodiment may be applied to a case of switching from the NA stoichiometric combustion mode to the supercharged lean combustion mode, and a case of switching from the rich spike combustion mode to the supercharged lean combustion mode.

In the timing chart illustrated in FIG. 11, the execution of the up-shift is regulated when the up-shift condition and the switching condition are simultaneously satisfied, but this is not the sole case. For example, even if the timing the up-shift condition is satisfied and the timing the switching condition is satisfied are not simultaneous, the execution of the up-shift may be regulated if the interval of such timings is within a predetermined period.

In the fourth embodiment described above, the up-shift is executed in a stepwise manner when the execution of the up-shift is allowed after the execution of the down-shift, but this is not the sole case. For example, the originally intended up-shift may be executed at once at the time point the supercharging pressure reaches the required supercharging pressure after the execution of the down-shift.

Other Embodiments

The embodiments for implementing the present invention have been described above, but the present invention is not limited by only the first to fourth embodiments described above.

In the first to fourth embodiments and the modifications thereof described above, the automatic transmission 4 is configured by a stepped transmission, but this is not the sole case, and may be configured by a continuously variable transmission.

The control flow is not limited to the order of processes in the flowcharts described in the first to fourth embodiments described above, and may be changed within a consistent scope.

The vehicle control device according to any one of the embodiments of the present invention does not execute the up-shift of the change gear ratio in the automatic transmission if both conditions of the up-shift condition and the switching condition are satisfied. In other words, the decrease in the engine rotation number can be suppressed by not executing the up-shift of the change gear ratio. Therefore, the supercharging pressure can be rapidly raised to the required supercharging pressure required in the supercharged lean combustion mode, and the delay in the transition to the supercharged lean combustion mode can be suppressed.

Therefore, the vehicle control device according to any one of the embodiments of the present invention has an effect of being able to suppress the lowering of the fuel efficiency.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle control device for being mounted on a vehicle including an engine with a supercharger and an automatic transmission coupled to the engine, and for controlling an operation of the vehicle, the vehicle control device programmed to:
   execute an up-shift of a gear ratio in the automatic transmission;
   determine, based on a speed of the vehicle detected by a vehicle speed sensor and an accelerator opening information detected by an accelerator opening sensor, when an up-shift condition for executing the up-shift of the gear ratio is satisfied;
   determine when a switching condition for switching from one of a stoichiometric combustion mode and a combustion mode of executing a rich spike control to a supercharged lean combustion mode is satisfied, wherein
      in the stoichiometric combustion mode, an air-fuel ratio of the engine is a stoichiometric air-fuel ratio, and
      in the combustion mode of executing the rich spike control, an exhaust gas of the engine is purified by occluding nitrogen oxide in a catalyst such that the air-fuel ratio is temporarily made rich; and
   command the up-shift of the gear ratio when the up-shift condition and the switching condition are satisfied.

2. The vehicle control device according to claim 1, further programmed to, after commanding the up-shift of the gear ratio and when a supercharging pressure by the supercharger reaches a required supercharging pressure required in the supercharged lean combustion mode, execute the up-shift of the gear ratio.

3. The vehicle control device according to claim 2, further programmed to, when commanding the up-shift of the gear ratio and prior to executing the up-shift of the gear ratio, execute a down-shift of the gear ratio.

4. The vehicle control device according to claim 3, further programmed to, after executing the down-shift of the gear ratio, execute the up-shift of the gear ratio in a stepwise manner when the supercharging pressure by the supercharger reaches a threshold value lower than the required supercharging pressure required in the supercharged lean combustion mode.

5. The vehicle control device according to claim 4, programmed to, when the supercharging pressure by the supercharger reaches the threshold value, change the gear ratio to a gear ratio prior to executing the down-shift of the gear ratio and, when the supercharging pressure by the supercharger reaches the required supercharging pressure, execute the up-shift of the gear ratio.

6. The vehicle control device according to claim 1, further programmed to, when commanding the up-shift of the gear ratio and prior to executing the up-shift of the gear ratio, execute a down-shift of the gear ratio.

7. The vehicle control device according to claim 6, further programmed to, after executing the down-shift of the gear ratio, execute the up-shift of the gear ratio in a stepwise manner when a supercharging pressure by the supercharger reaches a threshold value lower than a required supercharging pressure required in the supercharged lean combustion mode.

8. The vehicle control device according to claim 7, programmed to, when the supercharging pressure by the supercharger reaches the threshold value, change the gear ratio to a gear ratio prior to executing the down-shift of the gear ratio and, when the supercharging pressure by the supercharger reaches the required supercharging pressure, execute the up-shift of the gear ratio.

9. The vehicle control device according to claim 1, wherein the predetermined combustion mode is the stoichiometric combustion mode.

10. The vehicle control device according to claim 1, wherein the predetermined combustion mode is the combustion mode of executing the rich spike control.

* * * * *